United States Patent
Chen (10) Patent No.: US 9,460,595 B2
(45) Date of Patent: *Oct. 4, 2016

(54) MULTIPLE DETECTION FUNCTION MODULARIZED LIGHTING DEVICE

(71) Applicant: Kaipo Chen, Taoyuan (TW)

(72) Inventor: Kaipo Chen, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,888

(22) Filed: Apr. 23, 2015

(65) Prior Publication Data

US 2015/0249777 A1 Sep. 3, 2015

Related U.S. Application Data

(63) Continuation-in-part of application No. 13/220,720, filed on Aug. 30, 2011, now Pat. No. 9,228,731.

(30) Foreign Application Priority Data

Mar. 16, 2015 (CN) .......................... 2015 1 0114591

(51) Int. Cl.

| G08B 13/196 | (2006.01) |
|---|---|
| H04N 7/18 | (2006.01) |
| F21V 33/00 | (2006.01) |
| F21K 99/00 | (2016.01) |
| G08B 21/14 | (2006.01) |
| F21V 23/04 | (2006.01) |
| H04N 5/225 | (2006.01) |
| G08B 15/00 | (2006.01) |

(52) U.S. Cl.
CPC .......... *G08B 13/19617* (2013.01); *F21K 9/135* (2013.01); *F21V 23/0464* (2013.01); *F21V 23/0471* (2013.01); *F21V 23/0478* (2013.01); *F21V 33/0052* (2013.01); *F21V 33/0056* (2013.01); *G08B 13/19619* (2013.01); *G08B 13/19634* (2013.01); *G08B 21/14* (2013.01); *H04N 5/2252* (2013.01); *H04N 5/2256* (2013.01); *H04N 5/2257* (2013.01); *H04N 7/181* (2013.01); *H04N 7/183* (2013.01); *G08B 13/19695* (2013.01); *G08B 15/001* (2013.01)

(58) Field of Classification Search
None
See application file for complete search history.

(56) References Cited

U.S. PATENT DOCUMENTS

| 4,896,145 A * | 1/1990 | Lewkowicz | ........ F21V 33/0076 307/66 |
|---|---|---|---|
| 6,812,970 B1 * | 11/2004 | McBride | .......... G08B 13/19619 348/151 |
| 6,820,998 B2 * | 11/2004 | Chen | ...................... F21K 9/135 362/249.05 |
| 6,975,220 B1 * | 12/2005 | Foodman | ............ G06F 17/3089 340/506 |

(Continued)

FOREIGN PATENT DOCUMENTS

| EP | 2570723 B1 | 3/2013 |
|---|---|---|
| JP | 5481652 B | 4/2014 |

*Primary Examiner* — David N Werner
(74) *Attorney, Agent, or Firm* — Leong C. Lei (57) ABSTRACT

A multiple detection function modularized lighting device includes a housing having a front end in which positioning holes are formed and a detection module including sensors, a control module including a camera lens, an LED module, and a main power supply board mounted inside the housing. The control module is arranged to extend through a central portion of the detection module with the camera lens and the sensors embedded in the positioning holes. The main power supply board is electrically connected to the modules to allow the control module to drive the modules to each perform a corresponding operation, so as to provide the device with functions of detection, image recording, and lighting in multiple ranges.

8 Claims, 12 Drawing Sheets

(56) References Cited

U.S. PATENT DOCUMENTS

| | | | | |
|---|---|---|---|---|
| 7,327,254 B2* | 2/2008 | Chen | ............ | F21K 9/13 340/321 |
| 8,066,391 B2* | 11/2011 | Zhong | ............ | F21S 9/022 362/20 |
| 8,456,568 B2* | 6/2013 | Wendt | ............ | F21V 14/02 348/370 |
| 8,820,961 B2* | 9/2014 | Kim | ............ | F21S 8/086 348/143 |
| 9,228,731 B2* | 1/2016 | Chen | ............ | H04N 7/183 |
| 2004/0201989 A1* | 10/2004 | Raskas | ............ | H04N 5/2256 362/253 |
| 2008/0177646 A1* | 7/2008 | Frink | ............ | G06Q 10/1091 705/32 |
| 2009/0310342 A1* | 12/2009 | Chang | ............ | F21L 4/027 362/205 |
| 2010/0148672 A1* | 6/2010 | Hopper | ............ | F21V 23/0435 315/113 |

* cited by examiner

MULTIPLE DETECTION FUNCTION MODULARIZED LIGHTING DEVICE

CROSS-REFERENCE TO RELATED APPLICATION

This is a continuation-in-part of co-pending U.S. patent application Ser. No. 13/220,720 filed on Aug. 30, 2011 and owned by the present applicant.

TECHNICAL FIELD OF THE INVENTION

The present invention generally relates to a multiple detection function modularized lighting device, in which modularized components are assembled in a lighting device and various sensors are arranged to operate in combination with different modules so as to expand scope of application and use thereof to various lighting devices.

DESCRIPTION OF THE PRIOR ART

The progress of the LED (Light-Emitting Diode) technology, which causes a consequential result of an increase of the number of users, forces the manufacturers to put efforts in research and development of energy saving and illumination related techniques and also leads related commercial products toward being multiple functional.

Most of the multiple detection function LED products are generally products of short interval illumination in addition to indication or emergency lighting. A composite LED product that provides long interval lighting has long been not available. This is because the conventional multiple detection function LED product has a bulky size and requires very severe environmental conditions for installation. If such a product is used in combination with an LED for long term operation, then the influence caused by high temperature would worsen the accuracy of detection to quite an extent. In addition, if such a product is a category of optic detection, then the influence resulting from refraction of the LED light must be taken into consideration. Thus, for a user who needs both multiple modes of detection and long term illumination, additional expense is inevitable for building up an independent detection system.

Various proposals in this respect are available from prior art patent documents. For example, European patent EP2570723 B1 discloses a sensing lighting module with a photographing surveillance function and Japanese patent No. 5481652 also discloses a sensing lighting module with a photographing surveillance function. In respect of the light emitting from an LED, these prior art devices provide a structural arrangement for shielding the light so that a camera is protected from influence resulting from the light. IN view of the inconvenience of the prior art, the present invention aims to provide a lighting device that comprises various functions of detection and supports for long term illumination that are achieved on the basis of isolation of light in order to suit the needs of users who desire multiple detection functions and long term illumination.

SUMMARY OF THE INVENTION

The primary object of the present invention is to provide a multiple detection function modularized lighting device, which provides a lighting device with function of multiple ways of detection and long term illumination and video recording through connection of a detection module having multiple detection functions with a control module for use in combination with an LED module through electrical connection with and being energized by a main power supply board and also allows a product supply side to select and change according to different designated purposes of use and also provides an arrangement of rotary spherical seat to achieve adjustment of ranges of detection and video recording, so as to reduce the limitations of environmental conditions for the installation of the lighting device.

Compared to the drawbacks of the prior art, the present invention makes use of the structural connection between a detection module and a control module to achieve wide applications to various types of lighting device, including a regular LED light bulb, a ceiling light, an embedded light, a bay light, a fluorescent light tube, and wall lamp, to allow for activation of different modules according to different data of detection, and to help overcome the influences resulting from light refraction and high temperature caused by an LED module to maintain normal operations of illumination and detection. Further, a product supply side is allowed to select and change the components of the modules according to different needs so as to achieve configurations of modularization for applications requiring different functions.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention provides a multiple detection function modularized lighting device, which as shown in FIGS. 1-4, generally comprises: a housing (1), which is composed of an upper housing member (12) and a lower housing member (11). The housing (1) has an interior space in which a detection module (6), a control module (5), a light-emitting diode (LED) module (3), and a main power supply board (2) are mounted. The main power supply board (2) is electrically connected to each of the modules. The LED module (3) comprises one a plurality of LEDs (31). The lower housing member (11) receives therein a speaker module (111) that is connected to and driven by the control module (5). The upper housing member (12) comprises a plurality of positioning holes (121) and a plurality of positioning posts (122). The plurality of positioning holes (121) is respectively aligned with an embedded camera lens (51) and sensors (62). The detection module (6) comprises a substrate (61) on which a plurality of sensors (62) is mounted. The sensors (62) are respectively received in and housed by isolation hoods (68) of a corresponding number. A lower detection module cover (67) is mounted under the substrate (61) to protect the detection module (6) against undesired influence. The substrate (61) comprises a setting indicator (63), an LED flashing light (64), a microphone (65), and positioning threaded holes (66) formed therein. The setting indicator (63) may show flashing light of a short interval to indicate if operation instructions are normally performed. The LED flashing light (64) functions to receives a signal from the control module (5) and provides continuous lighting or repeated flashing light in a condition when the signal indicates a detected target meeting detection conditions is supplied from the control module. The number of the LED flashing light (64) used is not limited and may be increased or decreased as desired. The microphone (65) functions to receive audio sounds, which may be subsequently processed by the control module (5) to be transmitted to related ones of the modules. The positioning threaded holes (66) are used in combination with bolts to be screwed into and thus fixed to F J the positioning posts (122) of the upper housing member (12).

The control module (5) is generally composed of a module base (4) and an upper module cover (52) between which the modules of different functions are housed and enclosed. The module base (4) has a circumferential wall on which an antenna seat (41) is formed. The antenna seat (41) is provided for receiving and supporting an antenna for transmission and receipt of signal.

The control module (5) has a front end on which a camera lens (51) is mounted. A camera lens cover (53) is fit outside and houses the camera lens (51). The control module (5) is arranged to extend through a central portion of the detection module (6) and is also received in and fixed to the module base (4) by bolts. The LED module (3) is received in and fixed to a recess defined in an upper rim of the lower housing member (11) by bolts so that the camera lens (51) is received in one of the positioning holes (121). The entire structure is arranged to allow the upper housing member (12) to be set in combination with the isolation hoods (68) and the camera lens cover (53) for having the sensors (62) and the camera lens (51) completely embedded in the upper housing member (12). Further, the lower detection module cover (67) is arranged under the detection module (6) so that the control module (5) and the detection module (6) can be isolated from refracted light and high temperature generated by the LED module (3), allowing the detection module to normally operate for activating the control module (5) to perform related operations according to the detection condition.

Figure 1:
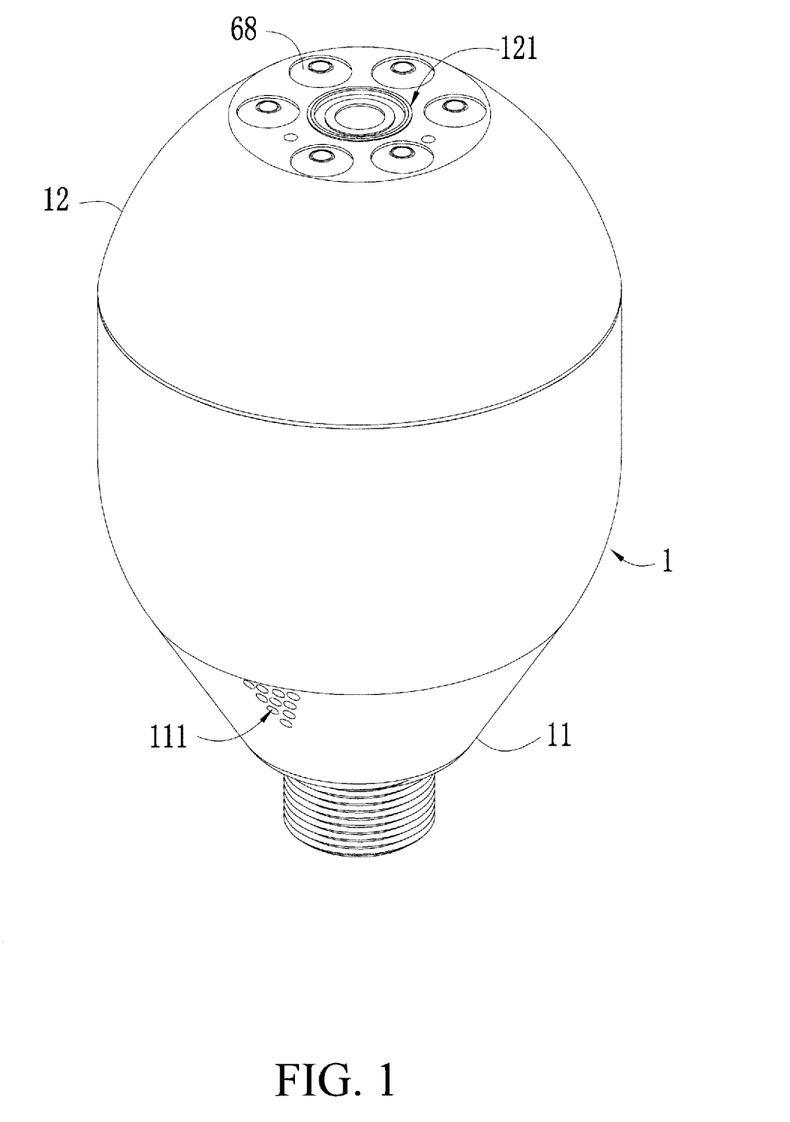
FIG. 1 is a perspective view of the present invention.
Figure 2:
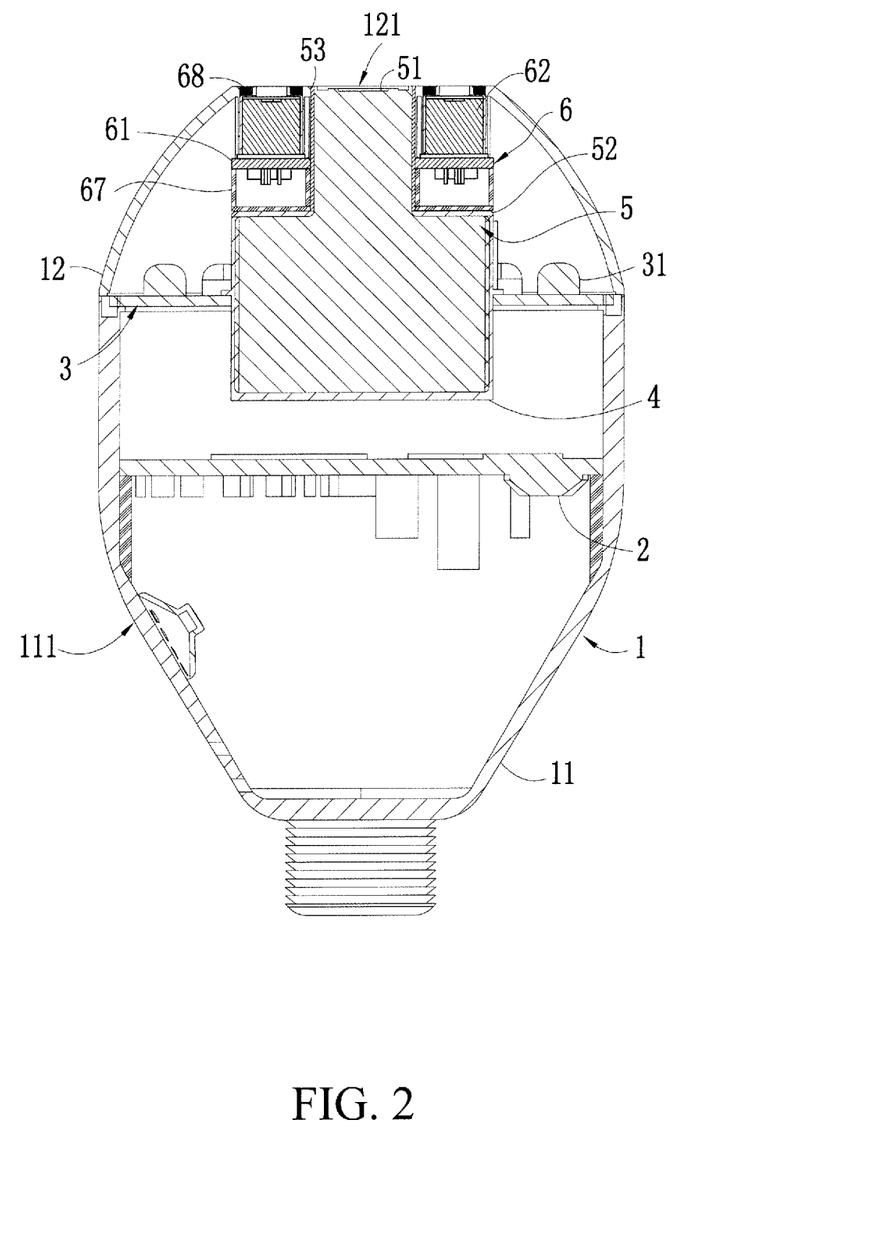
FIG. 2 is a cross-sectional view of the present invention.
Figure 3:
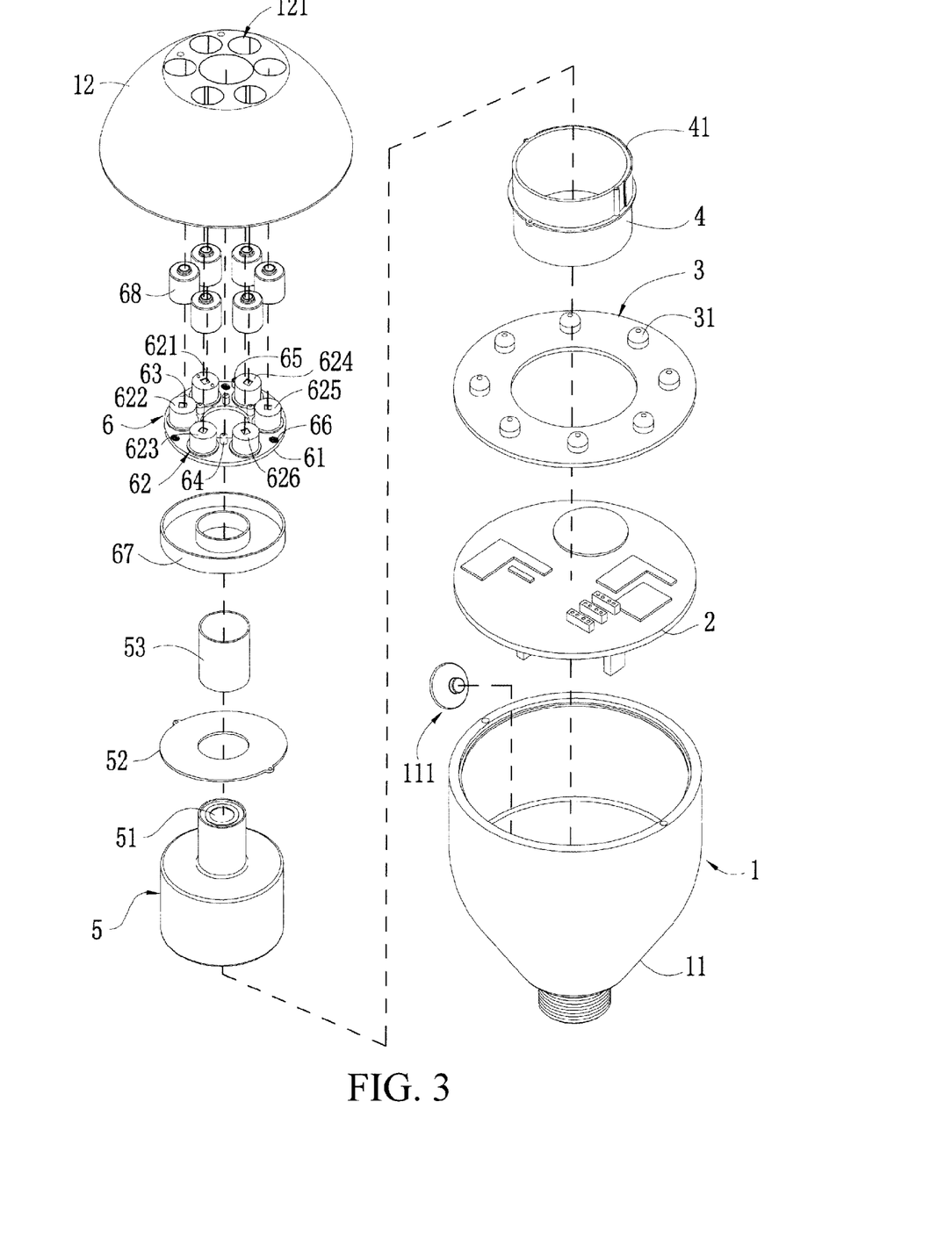
FIG. 3 is an exploded view of the present invention.
Figure 4:
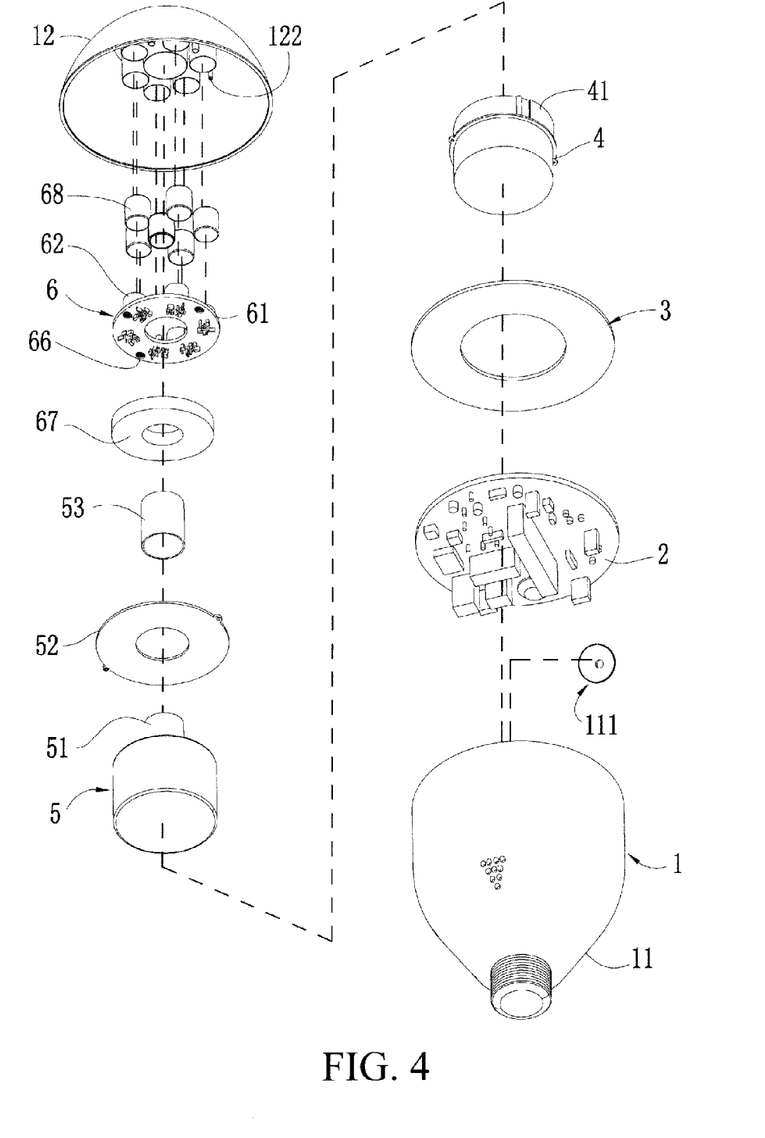
FIG. 4 is another exploded view of the present invention taken from a different perspective.
Figure 5:
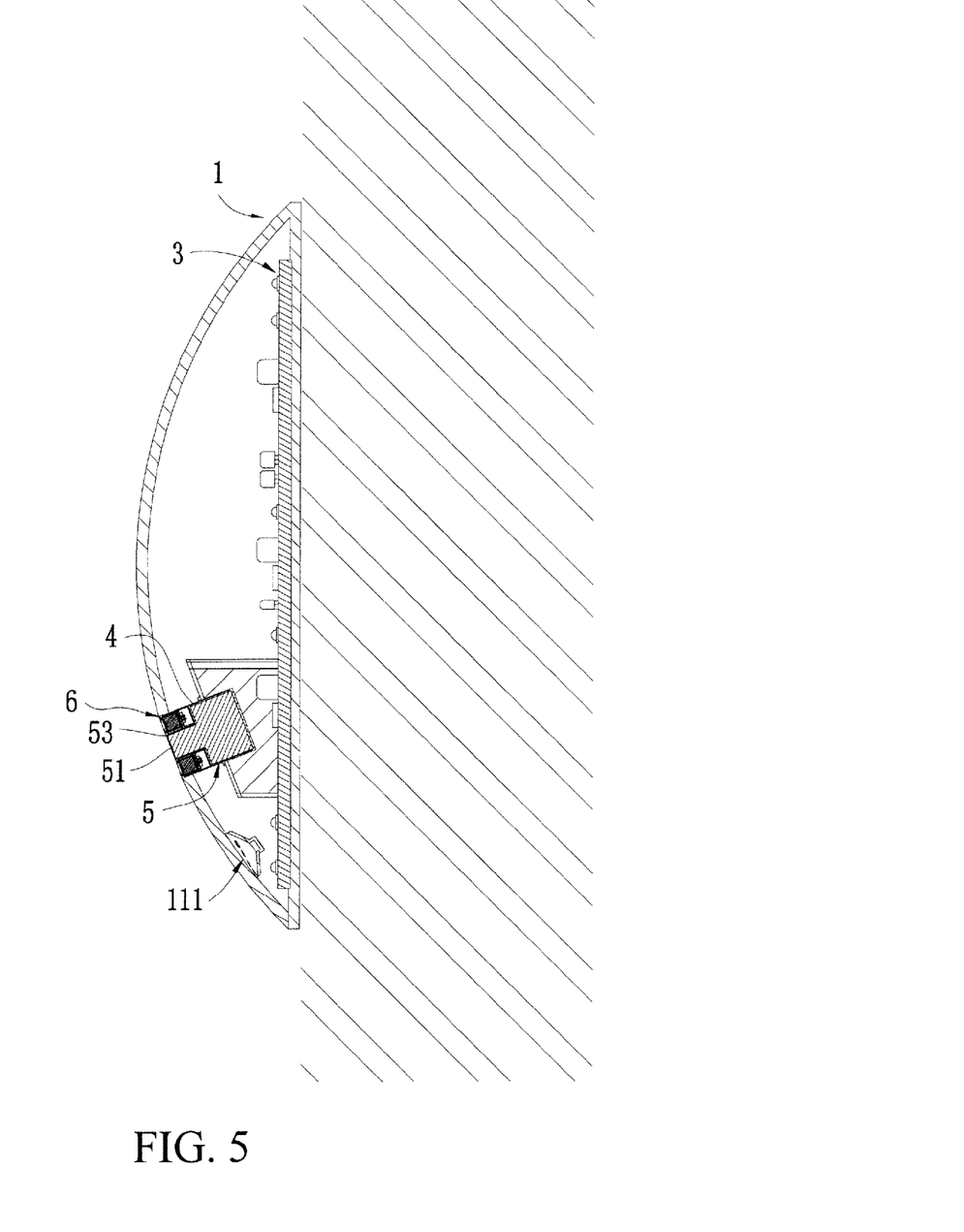
FIG. 5 is a cross-sectional view showing a second embodiment of the present invention.

A second embodiment of the present, which is a wall lamp, is illustrated in FIG. 5. The arrangement of the instant embodiment is achieved with a simple modification of the previous embodiment by first detaching the LED module (3) and the main power supply board (2) or other circuit board and then having them re-arranged and mounted outside the detection module (6) and the control module (5), making it available for applications to various types of lighting devices, not limited to what described herein.

Figure 6:
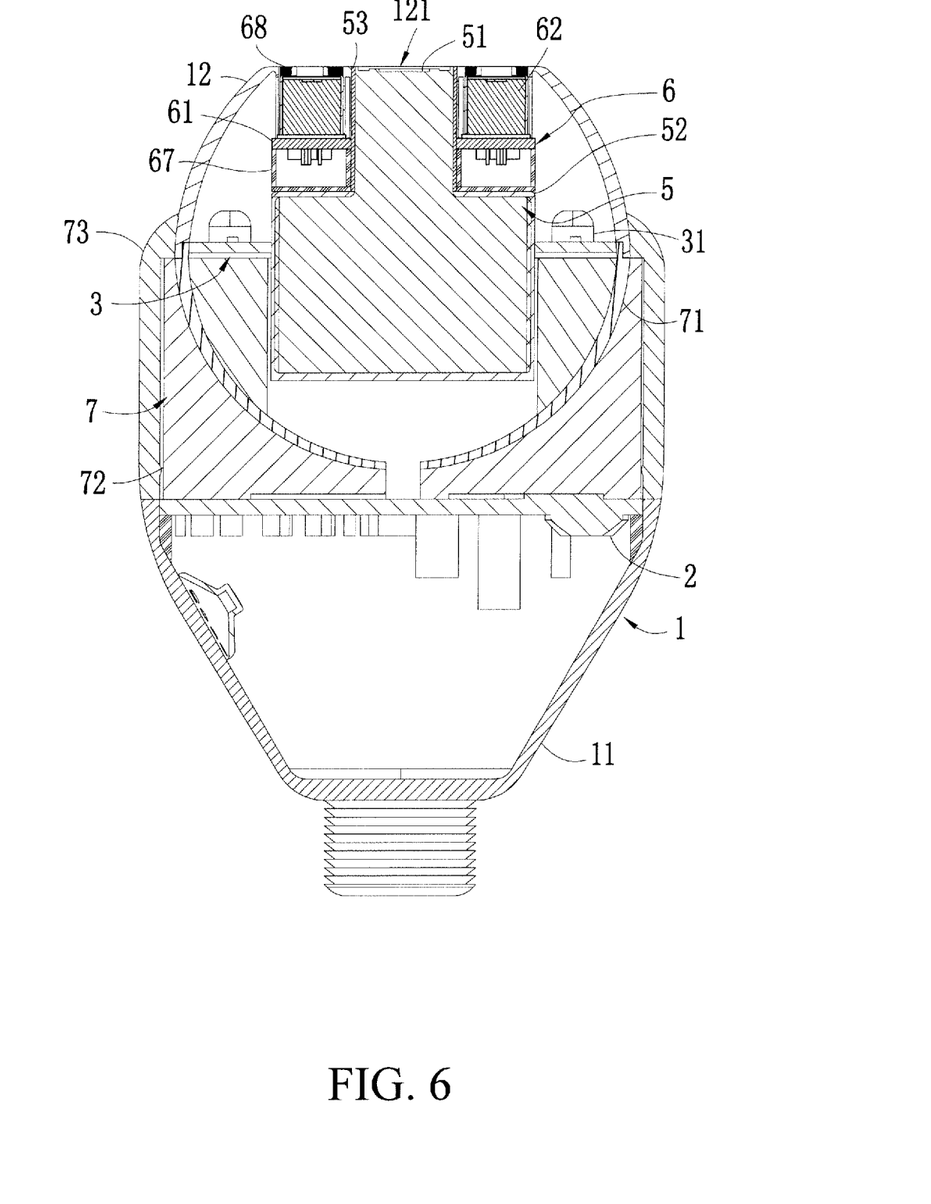
FIG. 6 is a cross-sectional view showing a third embodiment of the present invention.
Figure 7:
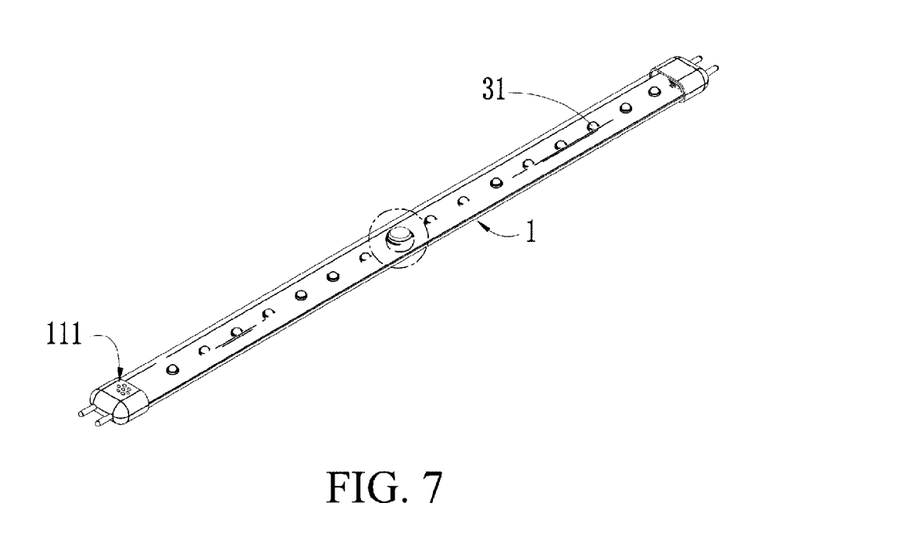
FIG. 7 is a perspective view showing a fourth embodiment of the present invention.
Figure 7A:
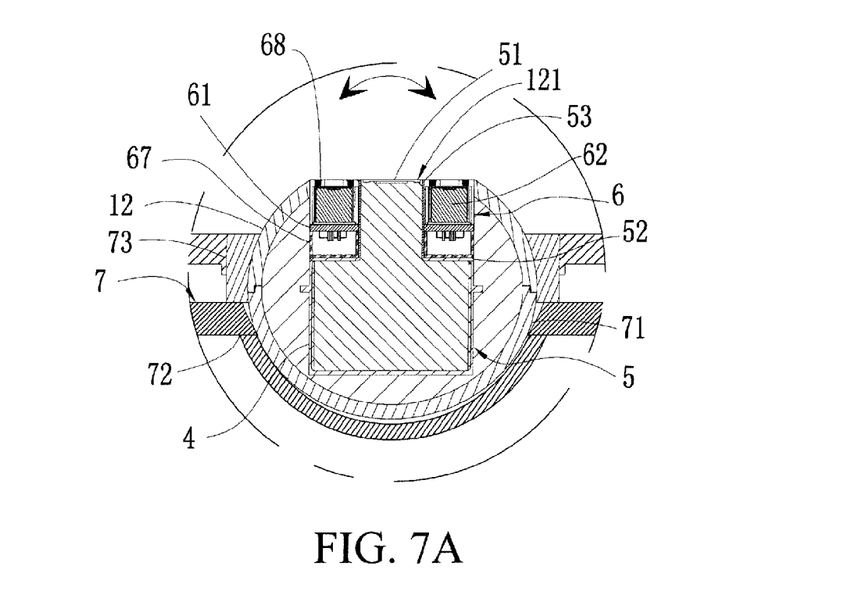
FIG. 7A is an enlarged cross-sectional view of a portion of the fourth embodiment of the present invention.
Figure 8:
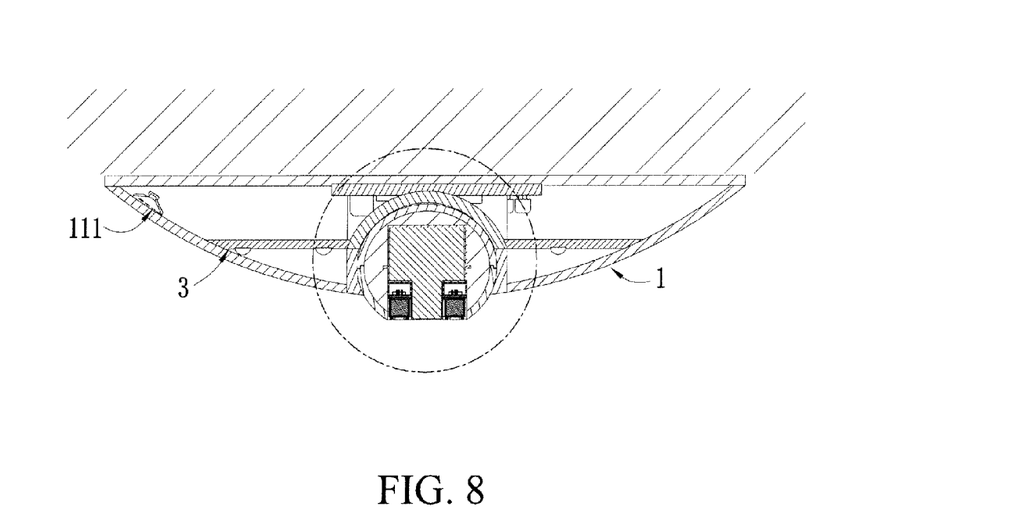
FIG. 8 is a cross-sectional view showing a fifth embodiment of the present invention.
Figure 8A:
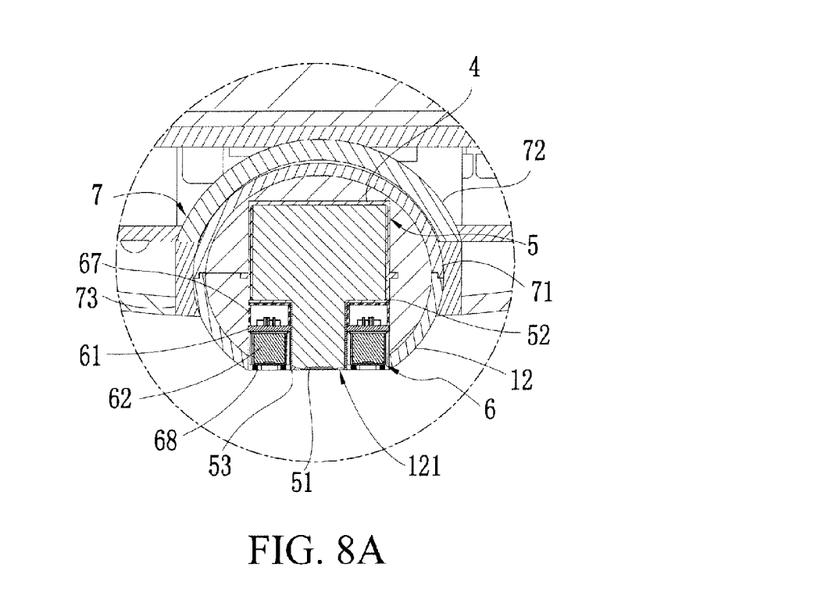
FIG. 8A is an enlarged cross-sectional view of a portion of the fifth embodiment of the present invention.
Figure 9:
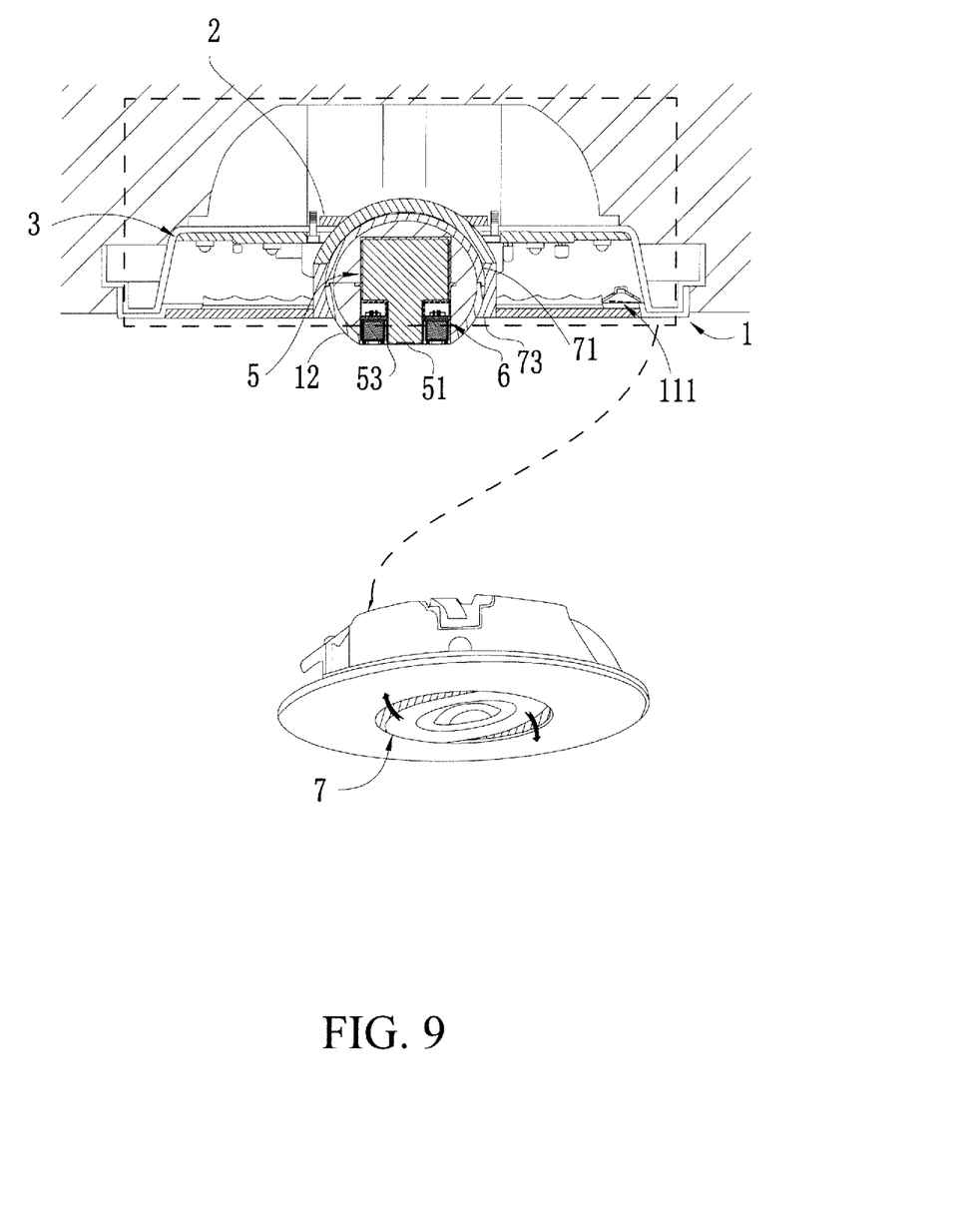
FIG. 9 is a cross-sectional view showing a sixth embodiment of the present invention.
Figure 10:
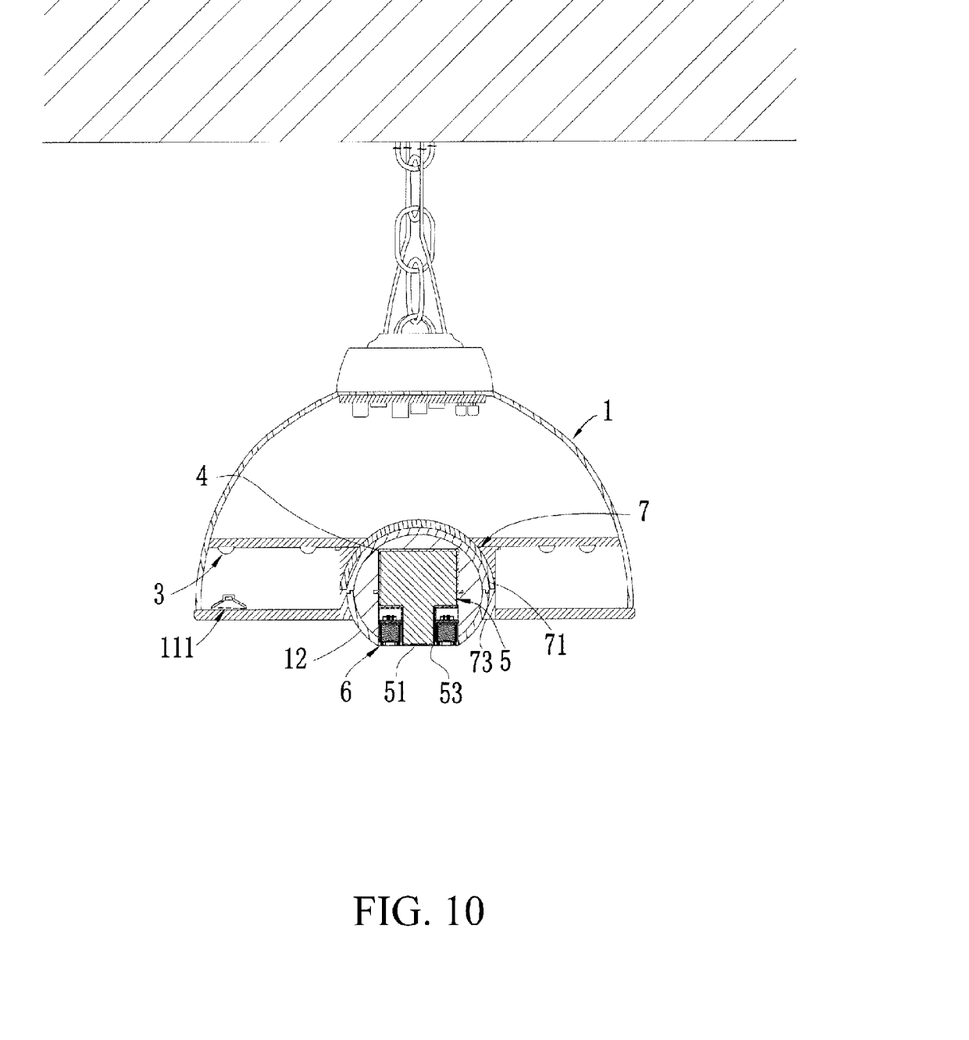
FIG. 10 is a cross-sectional view showing a seventh embodiment of the present invention.
Figure 11:
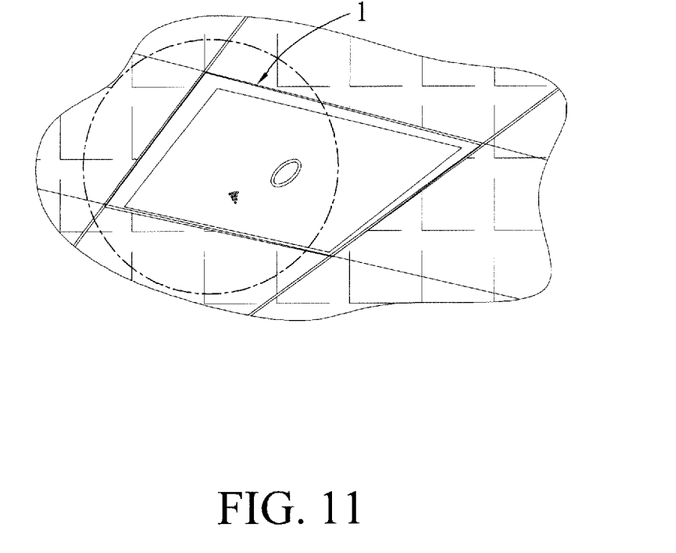
FIG. 11 is a perspective view showing an eighth embodiment of the present invention.
Figure 11A:
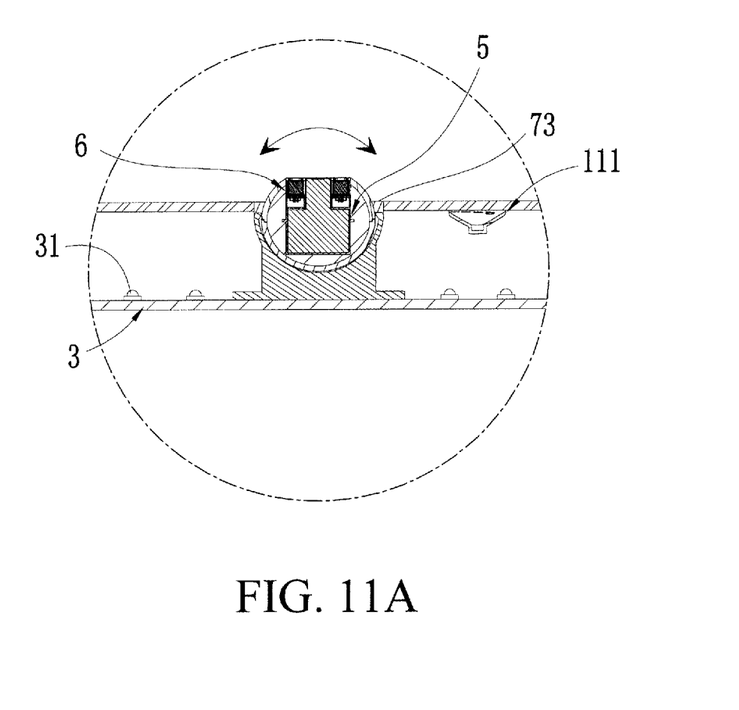
FIG. 11A is an enlarged cross-sectional view of a portion of the eighth embodiment of the present invention.

A third embodiment of the present invention is illustrated in FIG. 6 and comprises: a housing (1), on which a fixing casing (73) is mounted, the fixing casing (73) being arranged outside and circumferentially housing a rotary spherical seat (7) to limit a rotation range of a sphere (71); a detection module (6), which comprises a plurality of sensors (62) mounted on a substrate (61), the sensors (62) being respectively received in and housed by isolation hoods (68) of the same number so that the isolation hoods (68) block light and temperature from an LED module; a control module (5), which has a front end on which a camera lens (51) is mounted and received in and housed by a camera lens cover (53); and a rotary spherical seat (7), which is composed of a bottom base (72) and a sphere (71), the sphere (71) being composed of two hemispheres, wherein the sphere (71) has a front end portion that the forms an upper housing member (12) that comprises a plurality of positioning holes (121) formed therein and the sphere (71) has a rear end portion in which a heat dissipative material is mounted, wherein the control module (5) is set to extend through the detection module (6) and is also received in the sphere (71) and the positioning holes (121) respectively receive and hold the sensors (62) and the camera lens (51) therein, so that the detection module (6) may maintain a normal operation without being affected by interference of refraction of light and high temperature generated by the LED module (3) and the control module (5) may be operated to take pictures and wherein the fixing casing (73) is arranged to constrain the rotation range of the sphere (71) so as to make the detection module (6) and the control module (5) to be adjustable within a proper range. The instant embodiment is different from the previous ones in that a function of rotation is included in the structure of the lighting device in order to achieve adjustment to various directions thereby making the application thereof wider.

FIGS. 7-11A respectively illustrate fourth to eighth embodiments of the present invention, each comprising a simple modification of the previous embodiment by providing a rotary spherical seat (7) similar to that described above and an LED module (3) arranged outside the sphere (71), making it possible to be applicable to various types of lighting device, such as a fluorescent light, a ceiling light, an embedded light, and a bay light, but not limited thereto.

Figure 12:
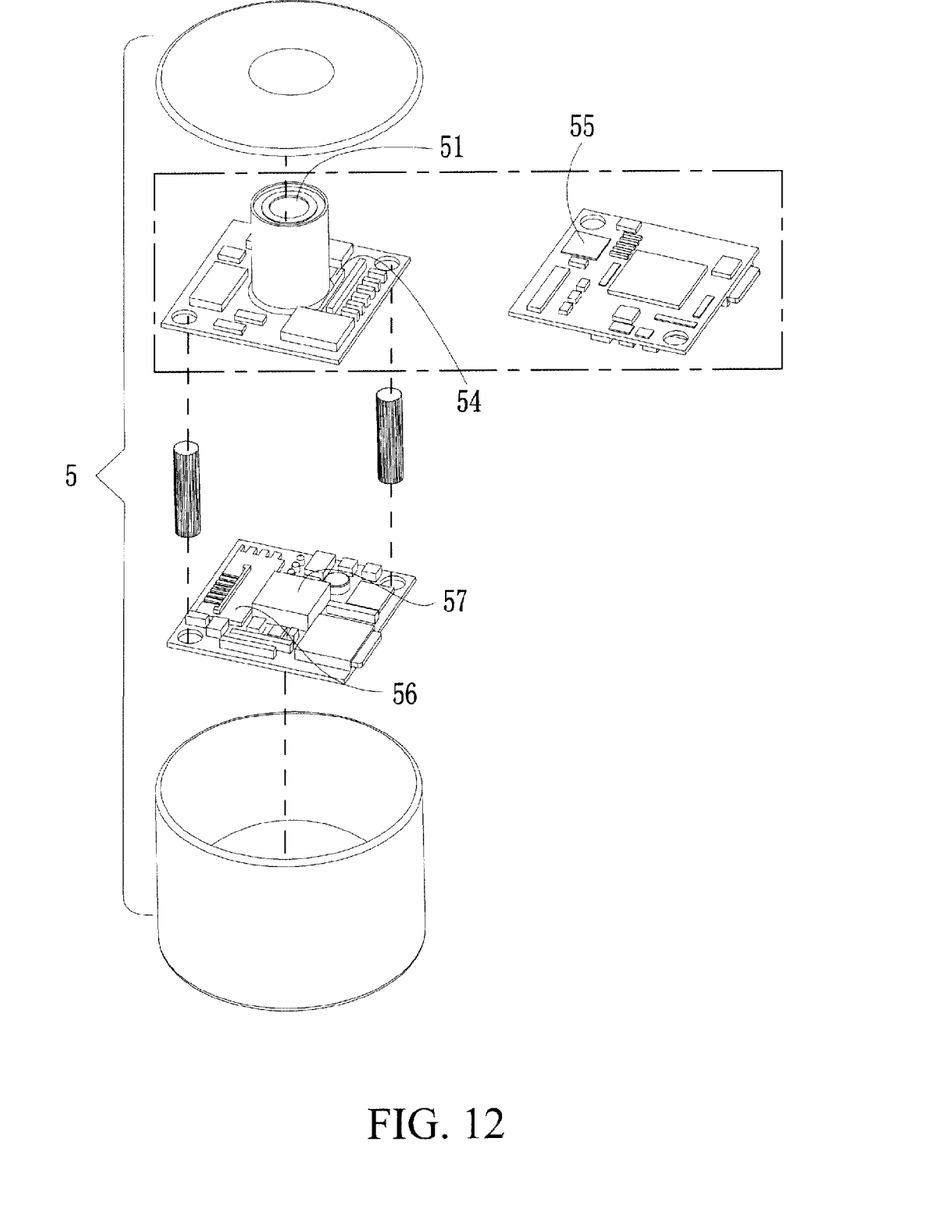
FIG. 12 is an exploded view showing a control module of the present invention

In each of the previous embodiments, as shown in FIG. 12, the control module (5) may further comprise: a photographing module (54) for recording an image, a WIFI and wireless module (55) for remote control, an inspection module (56) for analyzing data of the detection module, and a central processor module (57) for control of and connection among the above modules to have them driven to perform related operations. The modules can be changed and replaced at a product supply side according to practical needs. Further, a user or the product supply side may use a mobile application or APP to activate or deactivate the above operations without being limited to any specific type of the modules.

The detection module (6) may further comprise: a gas sensor (621), which functions to detect a harmful gas outside and nearby the housing (1), such as kitchen gas, monoxide in a bath room, or other harmful gases; a pressure sensor (622), which functions to detect the pressure external of the housing (1) for being used to detect the change of weather to raining; a temperature/humidity sensor (623), which functions to detect the temperature and humidity of the environment outside the housing (1) for being used to adjustment of environmental humidity; a body temperature sensor (624), which functions to detect the body temperature or movement of a person outside the housing (1) for being used to activate lighting or photographing of the camera lens; a smoke sensor (625), which functions to detect smoke in an external environment outside the housing (1) for being used for fire alarm or in an area where smoking is prohibited; an air sensor (626), which functions to detect if the content of suspending particles in an external environment outside the housing (1) exceeds a predetermined standard for being used to detect harmful fog of the outside environment in order to remind a user to wear an oral mask or provide other advice. All the sensors are provided for detecting if the conditions of the outside environment of the housing (1) meet the criterion of activation in order to transmit data to the control module (5) for decision making and operation performing.

An actual example of activation is as follows:

(1) The fuel gas sensor (621) and the air sensor (626): The fuel gas sensor (621) is provided for detecting monoxide and other harmful gases, such as leak of fuel gas, which moves through the housing (1) the positioning holes (121) to enter the fuel gas sensor (621) so that data of detection is transmitted to the control module (5) and the data is analyzed with the inspection module (56) of the control module (5) to allow the central processor module (57) to feed a signal to the LED flashing light (64) and the speaker module (111) to generate audio and video reminders and also to allow the APP to transmit a reminder, such as a short message or calling a mobile phone of a designated person, for notification. If the reminders receive no response and a predetermined level of danger is reached, then information (including images, addresses, or other predetermined data) is transmitted through a network to a fire department. In addition, different modes of communication and interconnection can be expanded through updating of the APP, but not limited thereto. Such an operation of detection is similar to a gas alarm detector (621). Further, this operation is also applicable to a smoke sensor (625).

(2) The pressure sensor (622), the temperature/humidity sensor (623), and the air sensor (626) are operable to respond to the pressure, temperature/humidity or harmful fog in the environment outside the housing (1) exceeding a predetermined threshold (which can be adjusted according to the default value set up in the APP) so as to have the APP reminding the user of the need for subsequent adjustment operations.

(3) The body temperature sensor (624) is used for the purpose of preventive activation of lighting, prevention of invasion of burglary, or remote control and monitoring and the body temperature sensor (624) can be used to detect the body temperature or movement of a person in the surrounding environment in order to activate the camera lens (51) for recording and to activate the APP to remind a user, allowing the user to activate, through the APP, subsequent operations, such as an option of reporting to the police station and canceling the recording operation of the camera lens.

From the above described embodiments, it can be appreciated that the present invention makes use of modularization of a structural arrangement to allow a detection module (6) to be arranged, in a compact way, closely next to the control module (5) for being widely used in various types of lighting device, whereby the control module (5) may be operable to drive each module to carry out a corresponding operation, allowing the present invention to achieve multiple functions of detection, recording, and lighting in multiple ranges and also allowing a product supply side to select and replace components of the sensors (62) and the control module (5) to achieve a purpose of modularization and utilization of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A multiple detection function modularized lighting device, comprising:
    a housing, which has a front end comprising a plurality of positioning holes formed therein;
    a light-emitting diode (LED) module;
    a detection module, which comprises a plurality of sensors mounted on a substrate, the sensors being respectively embedded in the positioning holes;
    a control module, which has a front end on which a camera lens is mounted to be embedded in one of the positioning holes, the control module being arranged to extend through a central portion of the detection module;
    a main power supply board, which is electrically connected to the modules to allow the control module to drive the modules to each perform a corresponding operation and achieve functions of detection, recording, and lighting in multiple ranges.

2. The multiple detection function modularized lighting device according to claim 1, wherein the control module further comprises:
    a photographing module for recording an image;
    a WIFI and wireless module for remote control;
    an inspection module for analyzing data of the detection module; and
    a central processor module for control of and connection among the modules to drive the modules to perform the corresponding operations, the modules being selectively removable from or included into the device in order to provide different combinations for suiting different needs.

3. The multiple detection function modularized lighting device according to claim 1, wherein the detection module further comprises:
   a fuel gas sensor for detecting a harmful gas outside the housing;
   a pressure sensor for detecting a pressure outside the housing;
   a temperature/humidity sensor for detecting environmental temperature/humidity outside the housing;
   a body temperature sensor for detecting a temperature or movement of a human body outside the housing in order activate lighting of the LED module or recording of the control module;
   a smoke sensor for detecting smoke outside the housing; and
   an air sensor for detecting content of suspending particles in an environment outside the housing, wherein the sensors each detect if an environmental condition outside the housing meets a criterion for activation and transmit data to the control module for decision and operation.

4. A multiple detection function modularized lighting device, comprising:
   a housing;
   a light-emitting diode (LED) module;
   a rotary spherical seat, which comprises a bottom base and a sphere, the sphere having a front end portion comprising a plurality of positioning holes formed therein;
   a detection module, which comprises a plurality of sensors mounted on a substrate, the sensors being respectively embedded in the positioning holes;
   a control module, which has a front end on which a camera lens is mounted to be embedded in one of the positioning holes, the control module being arranged to extend through a central portion of the detection module;
   a fixing casing, which is arranged outside the rotary spherical seat and mounted to an upper end of the housing to constrain a rotational range of the sphere; and
   a main power supply board, which is electrically connected to the modules to allow the control module to drive the modules to each perform a corresponding operation and achieve functions of detection, recording, and lighting in multiple ranges, wherein the detection module and the control module are adjustable in angular positions thereof.

5. The multiple detection function modularized lighting device according to claim 4, wherein the LED module is arranged inside the sphere.

6. The multiple detection function modularized lighting device according to claim 4, wherein the control module further comprises:
   a photographing module for recording an image;
   a WIFI and wireless module for remote control;
   an inspection module for analyzing data of the detection module; and
   a central processor module for control of and connection among the modules to drive the modules to perform the corresponding operations, the modules being selectively removable from or included into the device in order to provide different combinations for suiting different needs.

7. The multiple detection function modularized lighting device according to claim 4, wherein the detection module further comprises:
   a fuel gas sensor for detecting a harmful gas outside the housing;
   a pressure sensor for detecting a pressure outside the housing;
   a temperature/humidity sensor for detecting environmental temperature/humidity outside the housing;
   a body temperature sensor for detecting a temperature or movement of a human body outside the housing in order activate lighting of the LED module or recording of the control module;
   a smoke sensor for detecting smoke outside the housing; and
   an air sensor for detecting content of suspending particles in an environment outside the housing, wherein the sensors each detect if an environmental condition outside the housing meets a criterion for activation and transmit data to the control module for decision and operation.

8. The multiple detection function modularized lighting device according to claim 4, wherein the LED module is arranged outside the sphere.

* * * * *